(12) United States Patent
Kadoma et al.

(10) Patent No.: US 6,388,034 B2
(45) Date of Patent: *May 14, 2002

(54) METAL ADHESIVE COMPOSITIONS AND METHOD OF BONDING ARTICLES THEREWITH

(75) Inventors: Yoshinori Kadoma, Meguro-ku; Tomomi Nakanishi, Osaka; Tetsuro Ohta, Joyo, all of (JP)

(73) Assignee: Kanebo Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,977

(22) PCT Filed: Mar. 27, 1996

(86) PCT No.: PCT/JP96/00795

§ 371 Date: Dec. 18, 1997

§ 102(e) Date: Dec. 18, 1997

(87) PCT Pub. No.: WO96/30454

PCT Pub. Date: Oct. 3, 1996

(30) Foreign Application Priority Data

Mar. 31, 1995 (JP) .............................. 7-100261

(51) Int. Cl.⁷ ................................. C08F 28/06
(52) U.S. Cl. ................... 526/256; 526/346; 526/348; 526/319; 526/327
(58) Field of Search ................................ 526/256, 346, 526/348, 319, 327

(56) References Cited

U.S. PATENT DOCUMENTS 3,364,184 A * 1/1968 Krukziener ................ 526/256
3,404,158 A * 10/1968 Yu
4,315,067 A * 2/1982 Gazard

FOREIGN PATENT DOCUMENTS

| EP | 0012652 | 6/1980 |
|----|---------|--------|
| JP | 62-292774 | 12/1987 |
| JP | 63-225674 | 9/1988 |
| JP | 1-83254 | 3/1989 |
| JP | 64-90276 | 4/1989 |
| JP | 5-117595 | 5/1993 |

OTHER PUBLICATIONS

"Organic Functional Group Preparation", by S. R. Sanders and W. Karo, Academic Press, New York, 1968, pp. 99 to 115, 245 to 268, and 269 to 300.

"Preparative Organic Chemistry", by G. Hiletag and A. Martini, John Wiley & Sons, New York, 1972, pp. 276 to 280, 355 to 368, and 377 to 378.

EPO Communication for European application 96 907 663.7–1217, dated May 3, 1999.

* cited by examiner

Primary Examiner—David W. Wu
Assistant Examiner—Ling-Siu Choi
(74) Attorney, Agent, or Firm—Snell & Wilmer LLP

(57) ABSTRACT

An adhesive composition for metals including an unsaturated thiirane compound having at least one thiirane group bonded with a saturated carbon atom and having at least one olefin-type double bond is provided. The composition is useful for adhesion of noble metals or noble metal alloys.

2 Claims, No Drawings

METAL ADHESIVE COMPOSITIONS AND METHOD OF BONDING ARTICLES THEREWITH

TECHNICAL FIELD

The present invention relates to an adhesive composition for metals, especially noble metals, and a method for adhering items using the same. The term "adhesive composition for metals" in this invention includes an adhesive composition for adhering a metal material to a metal material or to a non-metal material, and a metal surface treating material used for such adhesion. The adhesive composition according to the present invention is specifically useful in the field of dentistry.

BACKGROUND ART

In a wide variety of fields including dentistry, there has been a demand to strongly adhere an organic material to noble metals such as gold, platinum and palladium or an alloy mainly containing such noble metals. Specifically in the field of dentistry, use of noble metal alloys for crowns, inlays, etc. is indispensable, and thus an adhesive usable for these noble metal alloys has been demanded. Conventionally, such an adhesive cannot be found. Accordingly, the above-described adhesion needs to be done by a method of roughening a surface of the item to be adhered using sandblast or the like and causing the item to stick via the roughened surface by a mechanical engagement force or a method of coating the surface of the noble metal with a base metal by tin electrodeposition or the like and then adhering the items via the base metal surface. It has been pointed out that these methods have problems of being troublesome and providing a level of durability insufficient to realize long-term adhesion.

Recently, by the suggestion that a compound containing sulfur is effective in order to solve the above-mentioned problems, various types of adhesives for noble metals containing sulfur have been proposed. Examples of such sulfur compounds include triazinethiol group-containing compounds, the triazine having a thiol substituent (Japanese Laid-Open Publication No. 62-292774), mercapto group- or polysulfide group-containing compounds (Japanese Laid-Open Publication No. 63-225674), triazine-dithion derivative-containing compounds (Japanese Laid-Open Publication No. 64-83254), thiophosphoric acid group-containing compounds (Japanese Laid-Open Publication No. 64-90276), and dichlorothiophosphoryl group-containing compounds (Japanese Laid-Open Publication No. 5-117595). It has been reported that these compounds have a significant level of adhesiveness at the laboratory level. However, these compounds still have problems in stability in storage and long-time adhesion durability, and also require a long period of time for adhesion. Thus, these compounds are not satisfactory for practical use.

DISCLOSURE OF INVENTION

As a result of active studies in order to solve the above-described problems, the present inventors have found that all the above-described problems are solved by using a compound containing a thiirane group and an olefin-type double bond. Based on this discovery, the present inventors developed the present invention.

An adhesive composition for metals according to the present invention includes an unsaturated thiirane compound having at least one thiirane group bonded with a saturated carbon atom and having at least one olefin-type double bond.

In a preferred embodiment of the invention, the unsaturated thiirane compound is represented by general formula I:

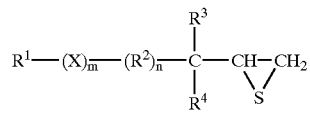

where $R^1$ is a group represented by

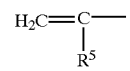

or general formula (II),

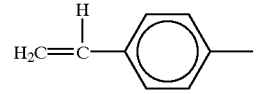

$R^2$ is an organic group having a carbon number of 1 through 40, and each of $R^3$ and $R^4$ is independently an organic group having a carbon number of 1 to 40, hydrogen, a thiirane group, or halogen, $R^5$ is hydrogen or a methyl group, X is —COO—, —OOC—, —CONH—, —NHCO—, or —O—, and each of n and m is independently 0 or 1, wherein in the case where at least one of $R^3$ and $R^4$ is an organic group, at least two of $R^2$, $R^3$ and $R^4$ can be bonded to each other to form a cyclic structure.

In a preferred embodiment of the invention, the adhesive composition for metals further includes an unsaturated olefin-type compound having at least one acid group.

In a preferred embodiment of the invention, the adhesive composition for metals is usable for adhesion of a noble metal or a noble metal alloy.

The present invention provides a method for adhering a first item having at least a metal surface portion and a second item which is intended to be adhered to the metal surface portion. The method includes the step of contacting the metal surface portion of the first item and the second item to each other via the adhesion composition for metals according to claim 1 and curing the composition.

In a preferred embodiment of the invention, the metal surface portion is formed of a noble metal or a noble metal alloy.

BEST MODE FOR CARRYING OUT THE INVENTION

An adhesive composition for metals according to the present invention contains an unsaturated thiirane compound having at least one thiirane group bonded with a saturated carbon and at least one olefin-type double bond. Such an unsaturated thiirane compound is not limited to any specific compound but various compounds can be used as the unsaturated thiirane compound. A compound having the general formula I shown below is preferable.

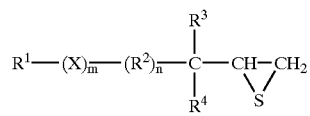

where $R^1$ is a group represented by

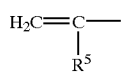

or general formula (II),

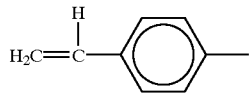
(II)

$R^2$ is an organic group having a carbon number of 1 through 40, and each of $R^3$ and $R^4$ is independently an organic group having a carbon number of 1 to 40, hydrogen, thiirane group, or halogen. In the case where at least one of $R^3$ and $R^4$ is an organic group, at least two of $R^2$, $R^3$ and $R^4$ can be bonded to each other to form a cyclic structure. $R^5$ is hydrogen or a methyl group, X is —COO—, —OOC—, —CONH—, —NHCO—, or —O—. Each of n and m is independently 0 or 1.

In this description, the term "organic group" refers to a group described by (i) or (ii) below.
  (i) Hydrocarbon group or substituted hydrocarbon group. Exemplary substituents in the substituted hydrocarbon group include halogen, a hydroxyl group, a carboxyl group, and a thiirane group.
  (ii) Hydrocarbon group or substituted hydrocarbon group containing at least one hetero linking group in a main chain thereof. Exemplary hetero linking groups include —O—, —CO—, —S—, —SO—, and —NH—. Two or more types of hetero linking groups can be included. The definition of the substituted hydrocarbon group is the same as the definition of the substituted hydrocarbon group in (i) above.

Exemplary cyclic structures obtainable by bonding at least two of $R^2$, $R^3$ and $R^4$ include an alicyclic group, an aromatic group, and a hetero alicyclic group; e.g., a cyclohexane ring, a benzene ring, and various spiroalicyclic groups.

Preferable compounds usable in the present invention among the unsaturated thiirane compounds represented by general formula I include a thiirane group-containing (meth)acrylate compound represented by formula III and a thiirane group-containing vinyl benzoate compound represented by formula IV:

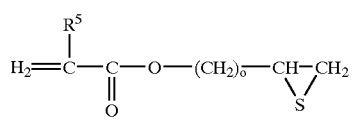
(III)

where $R^5$ is hydrogen or a methyl group, and o is an integer of 1 through 41.

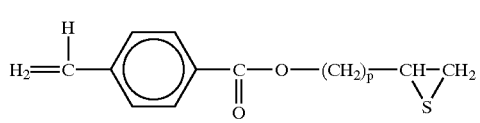
(IV)

where p is an integer of 1 through 41.

An unsaturated thiirane compound used in the present invention can be synthesized by a usual method. Some examples will be described below.

i) A compound represented by formula I, in which X is —COO— and m is 1

Such a compound can be synthesized by a plurality of methods, and typically by the steps shown below.

Scheme A

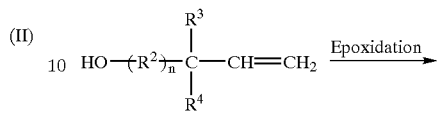
(V)

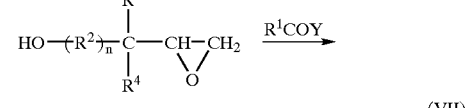
(VI)

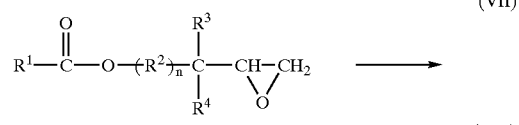
(VII)

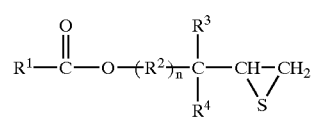
(VIII)

In scheme A, $R^1$ through $R^4$ and n are defined in the same manner as in formula I, and Y is halogen.

As shown in scheme A, first, vinyl group-containing alcohol represented by V is epoxidized to obtain an epoxy group-containing alcohol of VI. Next, through reaction with acid halide ($R^1COY$), a compound of VII is obtained. Then, through reaction with thiourea or the like, a thiirane group-containing compound represented by VIII is obtained.

For example, 9,10-epithiodecyl methacrylate (a compound represented by formula VIII, in which $R^1$ is $CH_2$=C($CH_3$)—, $R^2$ is —$CH_2$—, each of $R^3$ and $R^4$ is H, and n is 7) as an unsaturated thiirane compound can be prepared in the following manner. First, 9-decen-1-ol as a vinyl group-containing alcohol V is reacted with a peroxide such as m-chloroperbenzoic acid, thereby obtaining 9,10-epoxydecanol as an epoxy-containing alcohol VI. The resultant epoxy-containing alcohol is reacted with methacryloyl chloride as an acid halide, thereby obtaining 9,10-epoxydecyl methacrylate as an epoxy-containing ester VII. Thiourea is reacted with the resultant epoxy-containing ester, thereby obtaining 9,10-epithiodecyl methacrylate as a thiirane group-containing ester VIII.

Similarly, 9,10-epithiodecylvinyl benzoate (a compound represented by formula VIII, in which $R^1$ is $CH_2$=CH—$C_6H_4$—, $R^2$ is —$CH_2$—, each of $R^3$ and $R^4$ is H, and n is 7) as an unsaturated thiirane compound can be prepared in the following manner. First, 9,10-epoxydecanol is obtained as an epoxy-containing alcohol VI in the same manner as described above. The resultant epoxydecanol is reacted with vinylbenzoyl chloride as an acid halide, thereby obtaining 9,10-epoxydecyl benzoate as an epoxy-containing ester VII. Thiourea is reacted with the resultant epoxy-containing ester VII, thereby obtaining 9,10-epithiodecylvinyl benzoate as a thiirane group-containing ester VIII.

Among such compounds, a compound in which $R^2$, $R^3$ and $R^4$ are bonded to one another to form a cyclic structure can also be synthesized in a similar manner. For example, x-(1,2-epithioethyl)phenyl methacrylate (x=2, 3 or 4) represented by the following formula is obtained as follows.

Hydroxyvinylbenzene is used as the compound V and is epoxidized in accordance with scheme A, and then reacted with methacryloyl chloride and with thiourea sequentially.

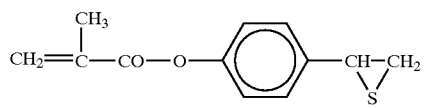

Also, x-(1,2-epithioethyl)benzyl methacrylate (x=2, 3 or 4) represented by the following formula can be synthesized in a similar manner using hydroxymethylbenzene as the compound V.

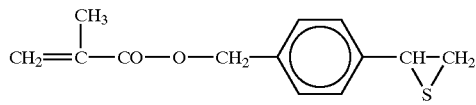

Alternatively, a compound in which $R^2$, $R^3$ and $R^4$ are bonded to one another to form a cyclic structure can also be synthesized by cleavage of an epoxy group by an acid having a double bond and reaction with thiourea. For example, 4-(1,2-epithioethyl)-2-hydroxycyclohexyl methacrylate can be synthesized using vinylcyclohexene epoxide as shown below. By such synthesis, an isomer thereof, 3-(1,2-epithioethyl)-2-hydroxycyclohexyl methacrylate is also produced.

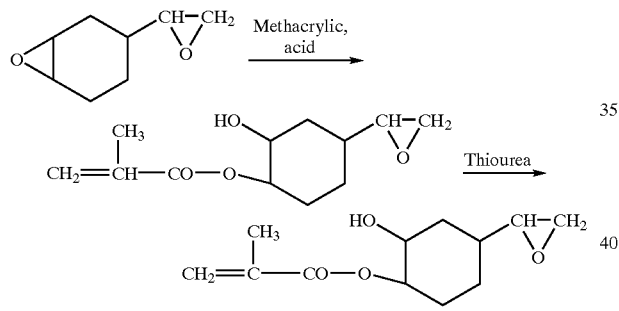

A compound containing a spiro ring, i.e., 3-(1,2-epithioethyl)-9-(1-hydroxy-2-methacryloyloxyethyl)-2,4,8,10-tetraoxaspiro(5,5)undecane can be synthesized as shown below in a similar manner.

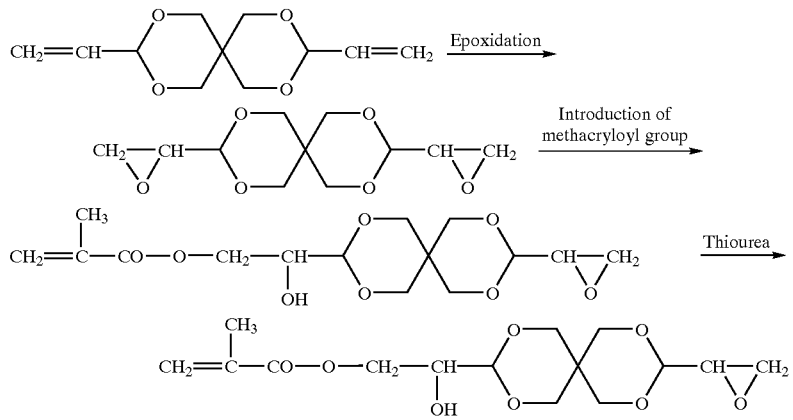

ii) A compound represented by formula I, in which X is —CONH— and m is 1

Such a compound can be synthesized by, for example, the following first or second method. According to the first method, a vinyl-containing halide (e.g., bromide) is epoxidized, and converted into a thiirane compound by thiourea. Next, the halogen is substituted by an amino group using ammonia, and then amidized by an acid halide having a double bond. According to the second method, a vinyl-containing halide is aminized using ammonia, and amidized by an acid halide having a polymerizable double bond. Then, the resultant substance is epoxidized and converted into a thiirane compound by thiourea. By this method, since a compound having two double bonds is epoxidized, a by-product produced by an oxidation of the polymerizable double bond is also obtained. Therefore, the conversion into a thiirane compound is performed after optional distillation or purification using a column or the like. A compound in which $R^1$ is $CH_2=C(CH_3)CO—$ can be synthesized as shown below using methacryloyl chloride as an acid halide.

First method

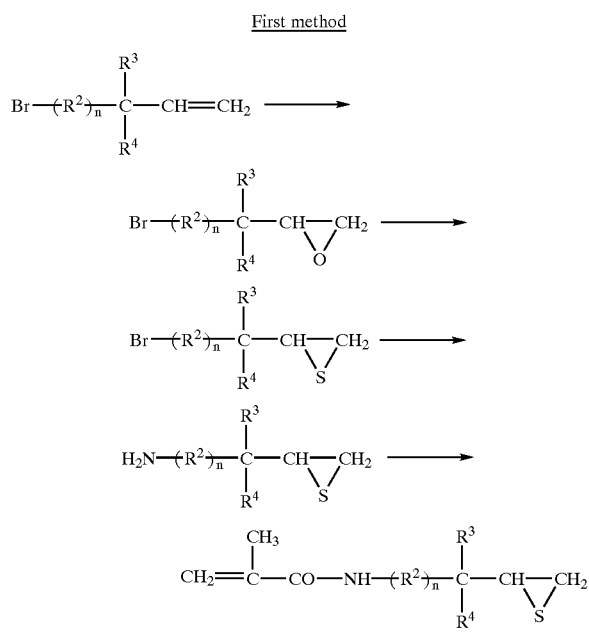

Second method

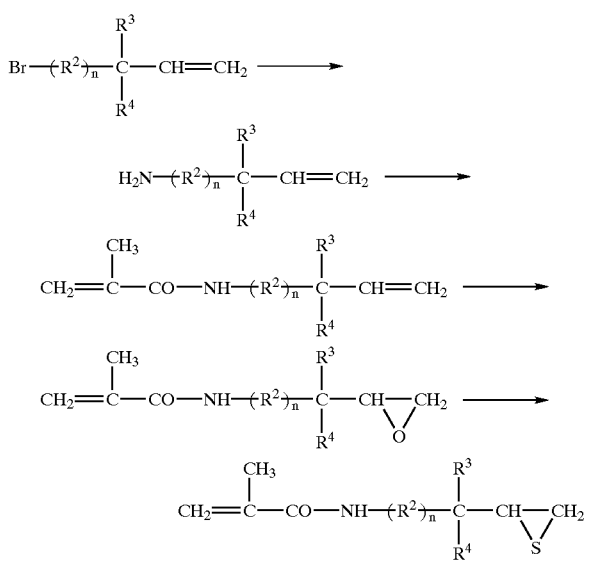

iii) A compound in which X is —O— and m is 1

An example of synthesis of such a compound is shown below. According to this method, a compound having an ether linkage is obtained by reaction of hydroxyvinylbenzene and glycidyl chloride in the presence of an alkali (e.g., NaOH) and then the resultant product is converted into a thiirane compound.

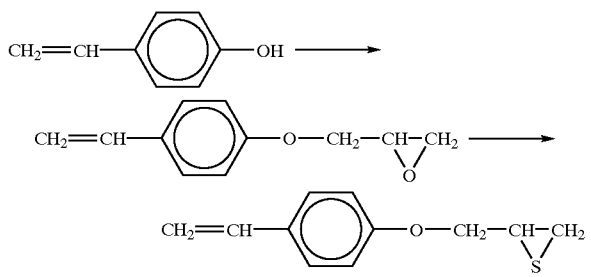

The products obtained by the above-described methods can each be purified by use of a column or the like.

An adhesive composition for metals according to the present invention can be mainly in the following two forms. One of the forms is a primer containing the unsaturated thiirane compound in a solvent, which is used as a material for treating the metal surface for the purpose of adhering. The other form is an adhesive for metals containing the unsaturated thiirane compound and a polymerizable compound other than the above-mentioned thiirane compound. These compositions are prepared by (1) and (2) described below.

(1) A primer is obtained by dissolving the unsaturated thiirane compound in a solvent. As the solvent, a volatile organic solvent having a boiling point of 250° C. or less (e.g., methanol, ethanol, acetone, ethyl acetate, or methylene chloride), water or a mixture thereof is used. The unsaturated thiirane compound is contained at a ratio of 0.0001 to 50 wt. %, preferably of 0.001 to 10 wt. % with respect to the total amount of the compound and the solvent. As necessary, a polymerization initiator or a copolymerizable monomer described below is added at this point.

The resultant primer is applied to a metal surface of a first item, and thus the treatment of the metal surface is performed. A usual adhesive is applied to the metal surface provided with the primer, and a second item is adhered to the metal surface via the usual adhesive. As the usual adhesive, a dental bonding material, a composite resin, or dental cement can be used. The unsaturated thiirane compound has a sufficient bonding effect even though contained in a very small amount. This is considered to be because the compound is adsorbed onto the metal surface as a monomolecular layer and thus generates an adhering effect. The adhering effect is not reduced even if the metal surface provided with the primer is washed by a solvent or the like.

(2) The above-described unsaturated thiirane compound is dissolved in or mixed with a monomer which is copolymerizable with the compound, and used as an adhesive. Usable copolymerizable monomers include (meth)acrylates usually used for dental purposes and an unsaturated olefin-type compound containing an acid group used as a monomer adhesive to teeth or base metals (e.g., nickel-chrome). Exemplary (meth)acrylates described above include methyl methacrylate, 2-hydroxyethyl methacrylate, triethyleneglycol dimethacrylate, neopentylglycol dimethacrylate, 2,2-bis [4-(3-methacryloyloxy-2-hydroxypropoxy)phenyl]propane (referred to simply as "Bis-GMA"), and pentaerythritol tetraacrylate. Exemplary unsaturated olefin-type compounds having an acid group described above include 4-methacryloyloxyethyltrimellitic anhydride, [2-(methacryloyloxy)ethyl]phenylhydrogenphosphate, and 10-(methacryloyloxy)decyldihydrogenphosphate. Specifically by using the unsaturated olefin-type compound having an acid group, a still higher adhesiveness can be obtained. The unsaturated thiirane compound is contained in the adhesive at a ratio of 0.005 to 50 wt. %, preferably of 0.1 to 20 wt. % with respect to the total amount of the compound and the copolymerizable monomer. To such an adhesive according to the present invention, a polymerization initiator can be added. Examples of such a polymerization initiator include thermally decomposable polymerization initiators such as a mixture of benzoyl peroxide and aromatic tertiary amine, tributylborane, and a mixture of aromatic sulfinic acid (or a salt thereof) and aromatic amine; and photoinitiators such as camphor-quinone. The above-described adhesive can further contain a filler, a solvent and a polymer other than the above-described polymers as necessary.

EXAMPLES

Hereinafter, examples of the present invention will be described more specifically, but the present invention is not limited to any of the following examples.

Example 1

Four test samples of each of the following noble metal alloys were prepared. Gold alloy: Casting Gold M. C. Type IV (GC Corp.); gold-silver-palladium alloy: Castwell M. C. (GC Corp.); and silver alloy: Sunsilver C. B. (Sankin Industry Co., Ltd.). Each test sample was obtained by using a cylindrical alloy piece having a diameter of 5 mm and a height of 8 mm and threading 4 mm of the alloy piece from one end at a prescribed pitch. The surface of one end of two test samples of each kind was washed and dried, and mirror-polished by wrapping film #4000. To the resultant surface, a 5 $\mu$l of 5 wt. % ethanol solution of 9,10-epithiodecyl methacrylate (hereinafter, referred to simply as "EP8MA") was applied. After leaving the surface for one day, the surface was washed by acetone and air-dried. To the surface of the test sample provided with EP8MA, a paste (paste I) formed of a mixture of methyl methacrylate and polymethyl methacrylate containing tributylborane partial oxidation product (TBBO) was applied. To the surface provided with the paste, a surface of another test sample of the same kind provided with EP8MA was contacted, thereby removing the excessive paste. The paste was cured by leaving the resultant test sample at room temperature for one hour. The resultant post-adhering test sample was immersed in 4° C. water and 60° C. hot water for one minute each, and this heating cycle was repeated 2000 times. The resultant test sample was subjected to a tensile test at a cross head rate of 2 mm/min., using a tensile tester (Autograph AGS-1000A, Shimadzu Corporation). A similar test was performed using, instead of paste I, a paste (paste II) formed of a mixture of methyl methacrylate containing 0.5 wt. % of N,N-dihydroxyethyl-p-toluidine and polymethyl methacrylate containing 1.0 wt. % of benzoyl peroxide. The results are shown together in Table 1.

TABLE 1

| Metal to which adhesive is applied | Adhering strength (MPa) | |
| --- | --- | --- |
| | Paste I | Paste II |
| Gold alloy | 36.2 | 40.7 |
| Gold-silver-palladium alloy | 35.8 | 40.4 |
| Silver alloy | 31.8 | 32.6 |

Example 2

The operation and measurement were performed in the same manner as in Example 1 except that a 0.05 wt. % ethanol solution of EP8MA was used and that the washing was omitted. The results are shown in Table 2.

TABLE 2

| Metal to which adhesive is applied | Adhering strength (MPa) | |
| --- | --- | --- |
| | Paste I | Paste II |
| Gold alloy | 35.3 | 36.7 |
| Gold-silver-palladium alloy | 35.0 | 35.6 |
| Silver alloy | 26.8 | 32.9 |

Example 3

A 6 wt. % ethanol solution was prepared using 9,10-epithiodecylvinyl benzoate in lieu of EP8MA used in Example 1. Test samples were prepared in a similar manner as in Example 1 using the solution, and the adhering strength was measured. The results are shown in Table 3.

TABLE 3

| Metal to which adhesive is applied | Adhering strength (MPa) | |
| --- | --- | --- |
| | Paste I | Paste II |
| Gold alloy | 39.2 | 34.1 |
| Gold-silver-palladium alloy | 39.7 | 41.2 |
| Silver alloy | 38.5 | 32.9 |

Example 4

A 0.06 wt. % ethanol solution was prepared using 9,10-epithiodecylvinyl benzoate in lieu of EP8MA used in Example 1. The operation and measurement were performed in the same manner as in Example 1 except that the washing was omitted. The results are shown in Table 4.

TABLE 4

| Metal to which adhesive is applied | Adhering strength (MPa) | |
| --- | --- | --- |
| | Paste I | Paste II |
| Gold alloy | 41.6 | 36.1 |
| Gold-silver-palladium alloy | 41.3 | 37.7 |
| Silver alloy | 37.2 | 32.7 |

Example 5

A piece of a noble metal alloy [gold alloy: K.18 M. C. Gold Alloy (GC Corp.); and gold-silver alloy: Castwell M. C. (GC Corp.)] having a size of 7×7×1 mm was prepared. A square column-shaped acrylic shaft having a size of 15 mm×15 mm×30 mm was prepared, and a 1 mm deep concaved portion was formed at a center of a 15 mm×15 mm surface of the rod, the concaved portion having the same size as that of the noble metal alloy piece so that the noble metal alloy piece could be buried in the concaved portion. An adhesive formed of 98% of acrylic monomer, 1% of BPO (benzoyl peroxide, Wako Pure Chemical Industries, Ltd.) and 1% of tertiary amine (Nippon Kayaku Co., Ltd.) was applied to the concaved portion, and the above-described piece was buried and secured. The surface having the noble metal alloy piece in a buried state was polished with #1500 wet polishing paper, and then supersonic washing and drying was performed. Separately from this, adhesives I through III each containing 10,11-epithiododecyl methacrylate (hereinafter, referred to simply as "EP9MA") as an unsaturated thiirane compound, triethyleneglycol dimethacrylate (hereinafter, referred to simply as "3G") as a copolymerizable monomer, 4-methacryloyloxyethyltrimellitic anhydride (hereinafter, referred to simply as "4MET") or 2-(methacryloyloxy) ethyldihydrogenphosphate (hereinafter, referred to simply as "PM") at the ratio shown in Table 5 were prepared.

TABLE 5

| Component | Adhesive I | Adhesive II | Adhesive III |
| --- | --- | --- | --- |
| EP9MA | 1 | 1 | 1 |
| PM | — | 1 | — |
| 4EMTA | — | — | 1 |
| 3G | 8 | 8 | 8 |
| Ethanol | 91 | 90 | 90 |

Next, a 0.5 mm thick Teflon® sheet having a circular opening having a diameter of 5 mm at a center thereof is pasted to the surface of the acrylic rod provided with the noble metal alloy. Then, either one of the adhesives I through III was applied to the surface of the noble metal alloy piece exposed by the opening with a small brush and left for several minutes. On the surface provided with the adhesive, photopolymerizable body opaque for hard resins (CESEAD™II, Kuraray, Co., was accumulated to a thickness of about 0.1 mm, and cured by a dental visible light illuminator. Furthermore, a dental photopolymerizable composite resin (Progress, Kanebo, Ltd.) was accumulated up to the surface of the Teflon® sheet, and cured by a dental visible light illuminator. The resultant surface of the adhesion test sample provided with the cured composite resin and a 10 mm×10 mm surface of a square column-shaped stainless steel shaft having a size of 10 mm×10 mm×20 mm were adhered to each other using a dental adhesive resin cement (PANAVIA®21, Kuraray Co., Ltd.) and left at room temperature for one hour. After the resultant object was immersed in 37° C. water for 24 hours, a tensile test was performed at a cross head rate of 2 mm/min., using a tensile tester (INSTRON). The results are shown in Table 6.

TABLE 6

| Metal to which adhesive is applied | Adhering strength (MPa) | | |
|---|---|---|---|
| | Adhesive I | Adhesive II | Adhesive III |
| Gold alloy | 8.6 | 15.5 | 17.4 |
| Gold-silver-palladium alloy | 13.0 | 16.6 | 15.7 |

Comparative Example

The operation and measurement were performed in the same manner as in Example 4 except that the adhesives IV through VI not including EP9MA shown in Table 7 were used. The results are shown in Table 8.

TABLE 7

| Component | Adhesive IV | Adhesive V | Adhesive VI |
|---|---|---|---|
| PM | — | 1 | — |
| 4META | — | — | 1 |
| 3G | 8 | 8 | 8 |
| Ethanol | 92 | 91 | 91 |

TABLE 8

| Metal to which adhesive is applied | Adhering strength (MPa) | | |
|---|---|---|---|
| | Adhesive IV | Adhesive V | Adhesive VI |
| Gold alloy | 2.3 | 2.7 | 4.3 |
| Gold-silver-palladium alloy | 1.1 | 2.7 | 4.4 |

Example 6

Adhesive I prepared in Example 5 was sealed and stored at 37° C. for 110 days. Using this, the operation and evaluation were performed in the same manner as in Example 5. The results are shown in Table 9 together with the evaluation of the adhesive I immediately after preparation in Example 5.

TABLE 9

| Metal to which adhesive is applied | Adhering strength (MPa) | |
|---|---|---|
| | 0 day | 110 days |
| Gold alloy | 8.6 | 9.6 |
| Gold-silver-palladium alloy | 13.0 | 12.8 |

INDUSTRIAL APPLICABILITY

An adhesive composition for metals according to the present invention can easily adhere items formed of noble metals which are difficult to adhere to each other by a usual method or an item formed of a noble metal and another item, without requiring troublesome processing such as tin electrodeposition. The adhesive composition for metals can be utilized as a primer containing a specific unsaturated thiirane compound or an adhesive containing such a compound and a polymerizable monomer. By such a composition, strong and highly durable adhering force can be obtained. Stability of the composition in storage is also satisfactory. Accordingly, an adhesive composition for metals and a method for adhering items using such a composition can be used in various fields, such as for adhering noble metal items in general and also specific fields such as dentistry, e.g., for fixing a metal crown to a crown of the teeth.

What is claimed is:

1. A method for adhering a metal using a composition comprising an unsaturated thiirane compound having at least one thiirane group bonded with a saturated carbon atom and having at least one olefin-type double bond;

wherein the unsaturated thiirane compound is represented by general formula I:

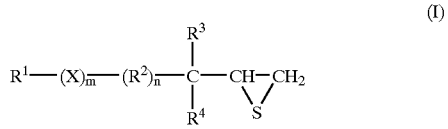

(I)

where $R^1$ is a group represented by

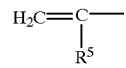

or general formula (II):

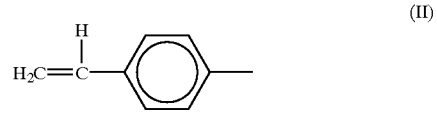

(II)

$R^2$ is an organic group having a carbon number of 1 through 40, and each of $R^3$ and $R^4$ is independently an organic group having a carbon number of 1 to 40, hydrogen, a thiirane group, or halogen, $R^5$ is hydrogen or a methyl group, X is —COO—, —CONH—, —NHCO—, or —O—, and each of n and m is independently 0 or 1, wherein in the case where at least one of $R^3$ and $R^4$ is an organic group, at least two of $R^2$, $R^3$ and $R^4$ can be bonded to each other to form a cyclic structure, and wherein, when n=0, m=1, X is —COO—, and $R^3$ and $R^4$ are both H, then $R^1$ is

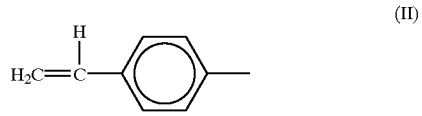

(II)

2. The method according to claim 1, wherein said metal is a noble metal or a noble metal alloy.

* * * * *